Dec. 1, 1931.   N. L. WARNER   1,834,560
TIRE BUILDING TOOL
Filed Sept. 4, 1928   2 Sheets-Sheet 1
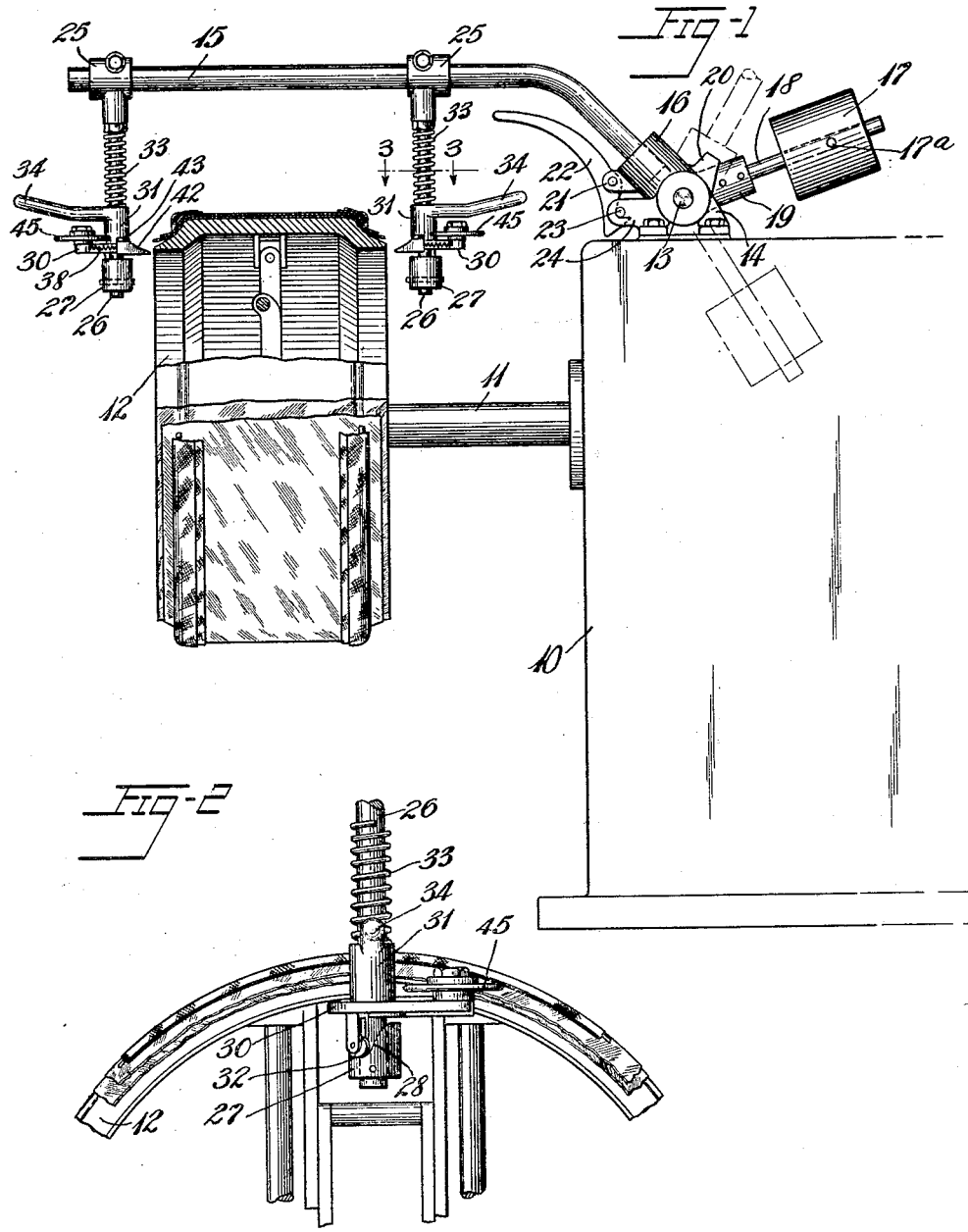

Dec. 1, 1931.    N. L. WARNER    1,834,560
TIRE BUILDING TOOL
Filed Sept. 4, 1928    2 Sheets-Sheet 2
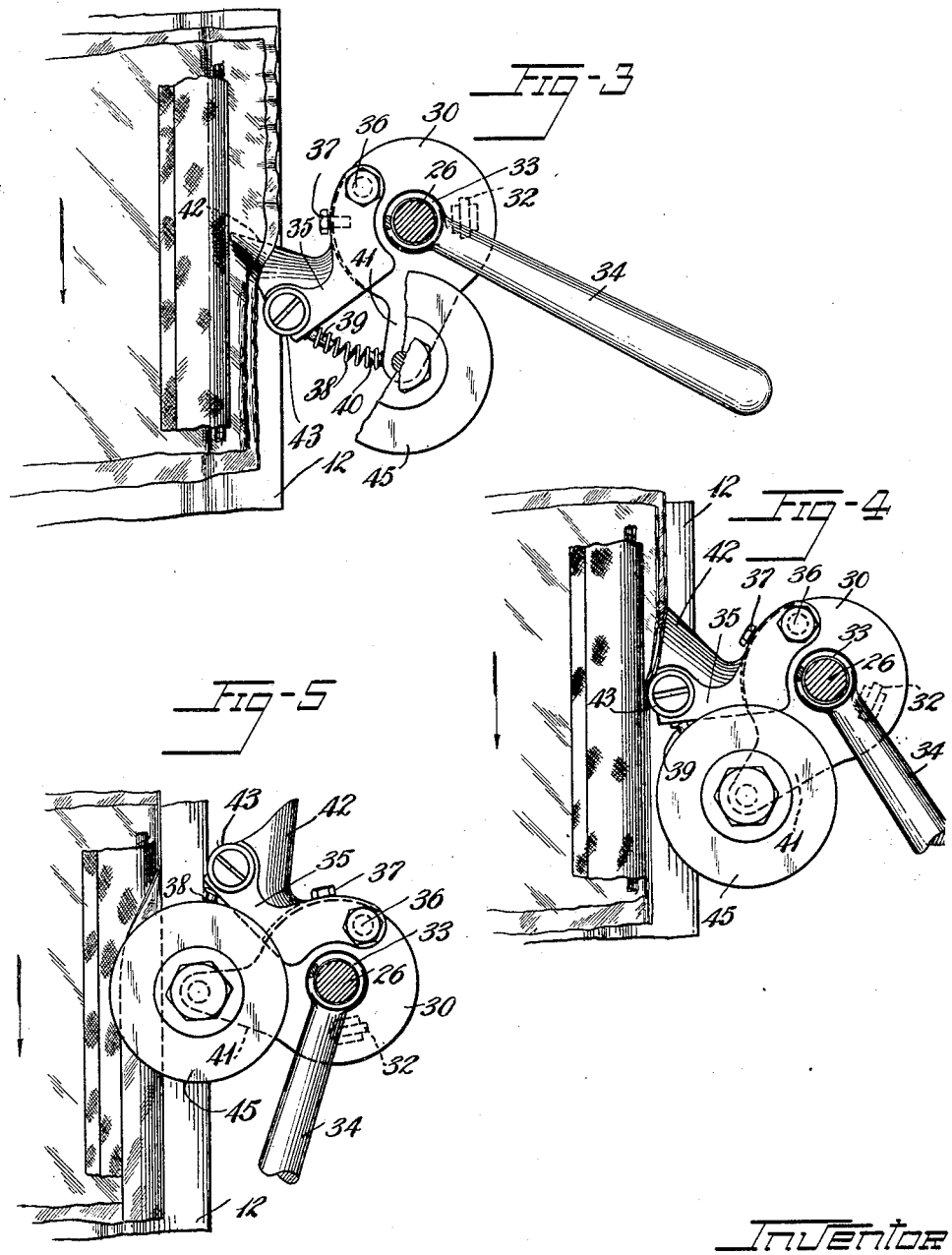

Patented Dec. 1, 1931

1,834,560

UNITED STATES PATENT OFFICE

NOAH L. WARNER, OF AKRON, OHIO, ASSIGNOR TO THE B. F. GOODRICH COMPANY, OF NEW YORK, N. Y., A CORPORATION OF NEW YORK

TIRE BUILDING TOOL

REISSUED

Application filed September 4, 1928. Serial No. 303,660.

This invention relates to tire-building apparatus and more especially to apparatus for folding the bead margin of a band of tire fabric about the bead core of a tire structure and stitching it down.

The invention has its principal field of utility in connection with the manufacture of tires by the pulley band or drum method in which it is especially efficacious in turning up of the fabric margins over the bead core and stitching the turned up margins in place rapidly and in a uniform manner.

The principal objects of my invention are to provide improved means for supporting a plurality of tire tools and for bringing them quickly and accurately into operative engagement with the work in the proper sequence for operations such as that mentioned; to provide improved tire fabric-turning means; to provide improved fabric-stitching means; to provide uniformity of operation and avoidance of injury to the stock notwithstanding surface roughness or irregularities in the fabric; and to provide a tool mounting adapted to move a tire tool quickly and accurately into or out of operative position adjacent the work and yet for securely and accurately holding it in such position.

Of the accompanying drawings:

Fig. 1 is a front elevation of a tire-building drum and work thereon, parts being sectioned or broken away, showing a pair of my improved tire tools in position for the beginning of the operation.

Fig. 2 is an elevation on a larger scale, from the left, of the left-hand tire tool of Fig. 1.

Fig. 3 is a horizontal section on the line 3—3 of Fig. 1, but with the tire tool in operation.

Fig. 4 is a horizontal section on the line 3—3 of Fig. 1 at a later stage of operation.

Fig. 5 is a horizontal section on the line 3—3 of Fig. 1 at the final stage of operation.

Referring to the drawings, 10 designates a tire-building machine having the usual rotatable spindle 11 upon which is mounted a tire-building drum 12 of a well-known type.

Positioned on the top of the frame of the machine 10 is a horizontally-arranged rotatable shaft 13 journaled at its respective ends in brackets 14, 14, and having its axis of rotation perpendicular to that of the drum-supporting spindle 11. A tool-carrying arm 15 has one end thereof retained in a socket member 16 secured on the shaft 13 for movement therewith in a vertical plane.

A counterweight 17 is adjustably mounted upon a lever member 18 for longitudinal movement along the latter, one end of the lever 18 being retained in a socket member 19 secured upon shaft 13. The counterweight 17 is provided with a set screw or the like $17^a$ for securing the weight at a desired position upon the lever 18 to adjust the leverage applied to the shaft 13 by the counterweight for offsetting or neutralizing the turning force applied to the shaft by the arm 15 and tools carried thereupon. The arrangement of the arm 15 and the counterweight 17 upon the shaft 13 is such that after the arm has been selectively positioned either in horizontal position transversely of the tire drum 12, or in raised position above the tire machine 10, the arm will be held in such position. The latter position of the arm is shown in dotted lines in Fig. 1.

The socket member 16 has a projecting shoulder 20 adapted to rest upon the top surface of the machine 10 when the arm 15 is in raised position and thus to serve as a stop member to prevent further movement of the arm under the influence of the counterweight.

The socket member 16 also is formed with an ear portion 21 upon which a latch member 22 is pivoted, the latter being adapted to take over a pin 23 extending from a projecting arm 24 formed on one of the brackets 14 for locking the arm 13 in horizontal position transversely across the tire drum when the tools carried thereby are in use and to prevent upward movement of the arm 15 due to the pressure of the work against the tools.

Spaced-apart brackets 25, 25 are adjustably mounted upon the arm 15 and are provided with respective stems 26, 26 which extend radially with relation to the arm 15, and which are positioned so as to be disposed at opposite sides of the tire drum 12 and to extend below the top face thereof at points equidistant from the medial plane of the tire drum when the arm 15 is in its operative horizontal position. In the latter position the stems 26 are substantially radial with relation to the tire drum 12. A supporting collar 27 having a cam surface 28 formed on its upper face is secured to each stem 26 adjacent the lower end thereof.

Swivelled on each of the stems 26 is a tool-supporting plate 30 formed with a hub portion 31, said plate being arranged for both angular and axial movement on said stem. A cam roller 32 is journalled in a bracket on the under surface of the plate 30, and is yieldingly urged against the cam surface 28 of the collar 27 by a compression spring 33 mounted upon the stem 26 between the bracket 25 and hub portion 31 of the plate 30. The arrangement is such that angular movement of the tool-supporting plate 30 through approximately 90° raises the plate from its lower operative position on the cam surface 28 to its upper operative position on the said cam surface.

The hub portion 31 of the supporting plate 30 is provided near its upper end with a handle 34 extending laterally therefrom, for use in manually turning the plate 30 upon the stem 26.

A slotted tool member 35 is pivoted at its slotted end to the supporting plate 30, near the outer margin thereof, by means of a pivot pin or bolt 36, the clearance between the base of the slot and the periphery of the plate permitting relative movement of the plate and tool member in a horizontal plane. A screw 37 is threaded into the periphery of the plate 30 where the latter is embraced by the slotted portion of member 35, the head of the screw engaging the margins of said slotted portion to limit pivotal movement of the member 35 away from the center of the supporting plate 30. A compression spring 38 having its end portions mounted upon lugs 39, 40 extending respectively from the rear face of the member 35, and from an arm portion 41 extending radially from the plate 30, normally urges the tool member against the stop screw 37 and offers yielding resistance to forces urging the tool member in the opposite direction.

The member 35 has one side of its free end laterally tapered to a point to provide a work-engaging plow face 42 adapted to be inserted between the fabric at the marginal portion of a tire structure and the underlying tire drum to turn said marginal portion upward against a tire-bead structure mounted adjacent the margin of the tire. The top face of the member 35 is flat and has a roller disc 43 mounted thereon for free rotation in a horizontal plane, said roller being adapted to engage the turned up marginal portion of the tire structure and press it into adhesive engagement with the tire-bead structure.

For engaging the margin of the fabric after it has been turned up against the bead structure and pressed into position thereon and for laying the fabric firmly and smoothly against the outer face of the tire, I provide a stitching disc or member 45 mounted on the arm 41 of the tool-supporting plate 30 for free rotation thereon in a horizontal plane.

In the operation of my improved apparatus, a partly-built tire structure including tire beads in position at the margins thereof being in position on the tire drum 12, the carrying arm 15 is manually lowered into horizontal position above and transversely of the tire drum, the latch member 22 engaging the pin 23, whereby the arm 15 is secured in the horizontal position, with the tool-supporting brackets positioned adjacent the respective side margins of the tire structure.

The tool-supporting plates preferably are concurrently rotated in opposite directions around their respective stems 26, 26 manually by means of the handles 34 until the point or leading edge of each of the plow faces 42 is moved to a position between the margins of the fabric plies of the tire and the underlying tire drum adjacent the tire bead, as shown in Fig. 3. As each plow face is so moved, the fabric moves along the curved surface of the plow face toward a position which is radial with relation to the tire drum, and adjacent the side of the tire bead. At the same time each of the members 30 moves upward axially of its stem 26 under the action of the cam roller 32 as the latter moves along the sloping portion of the cam surface 28 of collar 27 against the force of the compression spring 33. The upward movement of the plow face 37 assists the plow in moving the fabric margins substantially to radial position. The plow, during its period of functioning, is so held by its mounting in non-tangential relation to the fabric margin and the tire-building form as to effect an outward wiping of the under surface of the fabric margin,—that is to say, in a direction opposite to that of the movement of the tool,—during the time the tool moves from the outer edge of the fabric margin inwardly to the toe of the bead for turning up the fabric margin.

If during rotation of a tire structure the forward edge of a plow member should strike a buckled or raised portion in the fabric such as might be caused by the overlapping margins of successive plies of fabric, the spring 38 associated therewith permits yielding displacement of the plow member at the raised portion so as to prevent injury to the fabric by the forward edge of the plow, the latter being again pressed into engagement with the work under the force of the spring 38 after the said raised portion on the fabric has moved past the plow.

Thereafter, the continued angular movement of each tool-supporting plate 30 moves the respective plow members in an arcuate path out of contact with the turned up margins of the fabric at each side of the tire structure and brings the small rollers 43 into pressing engagement with these turned up margins whereby they are respectively forced against the respective beads at the opposite margins of the work and adhered thereto.

Still further angular movement of the tool-carrying plates 30 around their stems 26 moves the small rollers 43 out of engagement with the work and brings the edge and under surface of each stitcher disc 45 into engagement with the turned up fabric where, because of the non-radial relation of its axis to the tire-building form, and because of the non-tangential relation between the stitcher and the tire bead, so that the stitcher member has its axis approximately normal but slightly inclined with relation to the adjacent surface of the tire structure, it operates with a wiping action so as to lay the fabric firmly and smoothly in a uniform manner against the outer face of the tire structure. The upward movement of each of the plates 30 axially of its stem due to the action of the cam roller 32 upon the cam surface 28 continues substantially until the stitcher members reach their operative position in contact with the respective side margins of the tire structure. The stitcher disc operates first upon the fabric margins in contact with the bead in a direction from the toe of the bead toward the heel of the tire structure, and then upon the external side face of the bead in a direction away from the heel of the bead. As each stitcher disc is moved in the direction of the tire drum 12 by means of the handle 34 any tendency for the stitcher to dig into and injure the fabric is prevented by the yielding upward movement of the supporting plate 30 axially of the stem 26 when the pressure of the tire structure upon the stitcher member is sufficient to overcome the resistance of the spring 33, whereby the stitcher will ride or roll upon the outer, cylindrical surface of the fabric and lay it firmly against the outer face of the tire.

The use of my apparatus permits me to effect the various objects of my invention and to perform the successive operations of turning up and stitching down the margins of the fabric around the tire bead more quickly and more uniformly than heretofore, while accomplishing a substantial saving in time and labor. It is obvious that the two sets of tools may be manipulated at the same time, or that one set of tools may be manipulated alone for operating upon but one margin of a tire structure without departing from the essence of my invention.

My invention may be modified within the scope of the appended claims.

I claim:

1. Tire-building apparatus comprising a rotatably-supported tire-building form, a tool-support mounted for movement to a position at the side of the form and having a portion thereof positionable adjacent a margin of a tire structure mounted on the form, a tire-building tool associated with the tool-support, means for moving the tire-building tool radially of the form and yielding means for resisting the said radial movement of the tool and normally urging the tool toward inoperative position.

2. Tire-building apparatus comprising a rotatably supported tire-building form, a tool-support mounted to be moved radially of the form to a position at the side thereof, the support having a portion thereof positioned adjacent a margin of a tire structure mounted on the form, a tire-building tool pivotally associated with the tool-support, cam means associated with the tool whereby pivotal movement of the tool will move the same radially into operative engagement with a marginal portion of a tire structure mounted on the rotating form, and yielding means normally resisting the operative radial movement of the tool.

3. Tire-building apparatus comprising a rotatable tire-building form, a tool-support associated therewith having a portion thereof adjacent a marginal edge of a tire structure mounted on the form, a tool-mounting member pivotally mounted on the said support, and a plurality of tire-building tools associated with the tool-mounting member and adapted by progressive angular movement of the latter on its pivot to be successively brought into operative engagement with a margin of a tire structure mounted on the form.

4. Tire-building apparatus comprising a rotatable tire-building form, a bracket associated therewith extending radially of the tire-building form and having a portion thereof adjacent a marginal edge of a tire structure mounted on the form, a tool-supporting member journaled on the bracket, a plurality of tire-building tools positioned on the tool-supporting member and adapted by progressive angular movement of the latter with relation to said bracket to be successively brought into operative engagement with a margin of a tire structure mounted on the form.

5. Tire-building apparatus comprising a rotatable tire-building form, a tool-support associated therewith having a portion thereof extending radially of the form adjacent a marginal edge of a tire structure mounted on the form, a tool-mounting member pivotally mounted on the tool-support and also arranged for axial movement thereon radially of the form, a plurality of tire-building tools positioned on the tool-mounting member and adapted upon angular movement of the latter to be successively brought into operative engagement with a margin of a tire structure mounted on the form, and means on the tool-support cooperating with the tool-mounting member whereby pivotal movement of the latter causes a concurrent movement thereof along the tool-support radially of the form.

6. Apparatus as defined in claim 5 and including yielding means associated with the tool-support for resisting the movement of the tool-mounting member upon the bracket member radially of the form.

7. Tire-building apparatus comprising a tire-building form and a rotary disc stitcher tool for applying tire fabric to a tire structure built upon the form, the tool being mounted for movement in a direction from the toe toward the heel of the bead of the tire structure and then away from the heel of the bead upon the external side face of the bead and by its mounting held so disposed in non-tangential relation to the bead as to effect a wiping of the fabric in the direction of the said toe-to-heel movement and then in the direction of its said movement away from the heel of the bead while applying the fabric to the tire structure and pressing it in place.

8. Tire-building apparatus comprising a tire-building form and a rotary disc stitcher tool for applying tire fabric to a tire structure built upon the form, the tool being mounted in such non-symmetrical relation to the form as to effect a wiping of the fabric away from the heel of the bead on the external side face thereof while applying the fabric to the tire structure and pressing it in place.

9. Apparatus as defined in claim 8 in which the stitcher tool is so mounted with its axis approximately normal but slightly inclined with relation to the adjacent surface of the tire structure as to wipe the fabric only away from the heel of the bead on the external side face.

10. Tire-building apparatus comprising a rotatably-supported tire-building form and a rotary tire tool associated therewith for applying tire fabric to a tire structure being built upon the form, the tool being mounted to be moved transversely of the form to lift therefrom the fabric margin of the tire structure, the tool by its mounting being so held in non-tangential relation to the form as to effect during the movement of the tool along a portion of its path a progressive wiping of the fabric in a direction opposite to that of the said movement of the tool, and so as to turn up a marginal portion of the fabric upon the bead of the tire structure.

11. Tire building apparatus comprising a tire building form and a rotary stitcher tool for applying tire fabric to a tire structure built upon the form, the tool being mounted for movement to turn the margin of the fabric over the bead of the tire structure and stitch it against the structure, and by its mounting being held in such non-symmetrical relation to the bead as to effect an outward wiping of the fabric margin while the latter is turned over the bead.

12. Tire building apparatus comprising a tire building form and a freely rotatable stitcher disc for applying tire fabric to a tire structure built upon the form, the disc being mounted for movement to engage the margin of the fabric against a portion of the disc and to turn the fabric over the bead of the tire structure into engagement with another portion of the disc, and by its mounting being held in such non-symmetrical relation to the bead as to effect an outward wiping of the fabric margin during the latter's engagement with said disc portions.

In witness whereof I have hereunto set my hand this 27th day of August, 1928.

NOAH L. WARNER.